United States Patent
Melvin et al.

(10) Patent No.: US 6,272,552 B1
(45) Date of Patent: Aug. 7, 2001

(54) DUAL CHANNEL 100BASE-T LINK FOR COMPUTER NETWORKS

(75) Inventors: Bruce W. Melvin, Roseville; Bharat K. Singh, Granite Bay, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/160,463

(22) Filed: Sep. 24, 1998

(51) Int. Cl.[7] ................................................. G06F 15/16
(52) U.S. Cl. ............................... 709/250; 709/236
(58) Field of Search ................................. 709/250, 236, 709/237, 238; 370/420, 445, 463, 465; 341/51, 110; 375/233; 708/323

(56) References Cited

U.S. PATENT DOCUMENTS

| | | | | |
|---|---|---|---|---|
| 6,061,362 | * | 5/2000 | Muller et al. | 370/463 |
| 6,067,585 | * | 5/2000 | Hoang | 710/11 |
| 6,085,241 | * | 7/2000 | Otis | 709/223 |
| 6,094,436 | * | 7/2000 | Runaldye et al. | 370/420 |
| 6,094,439 | * | 7/2000 | Krishna et al. | 370/445 |

* cited by examiner

Primary Examiner—Mehmet B. Geckil

(57) ABSTRACT

A dual channel 100Base-T link for use between devices in a computer network system. The IEEE 802.3 standard for bus network systems calls for a device interconnection cable which includes four twisted pairs of wire. For 10BaseT and 100Base-T systems, the 802.3 standard specifies the use of only two of the four pairs. The present link includes a special Media Access Controller having dual channel interconnections, and primary and secondary Media Independent Interfaces and Physical Layers. This provides first and second communication channels which are parallel, but cooperating. The second channel is connected to the normally unused two pairs in the cable, effectively doubling the bandwidth of the link without running a new cable.

19 Claims, 4 Drawing Sheets

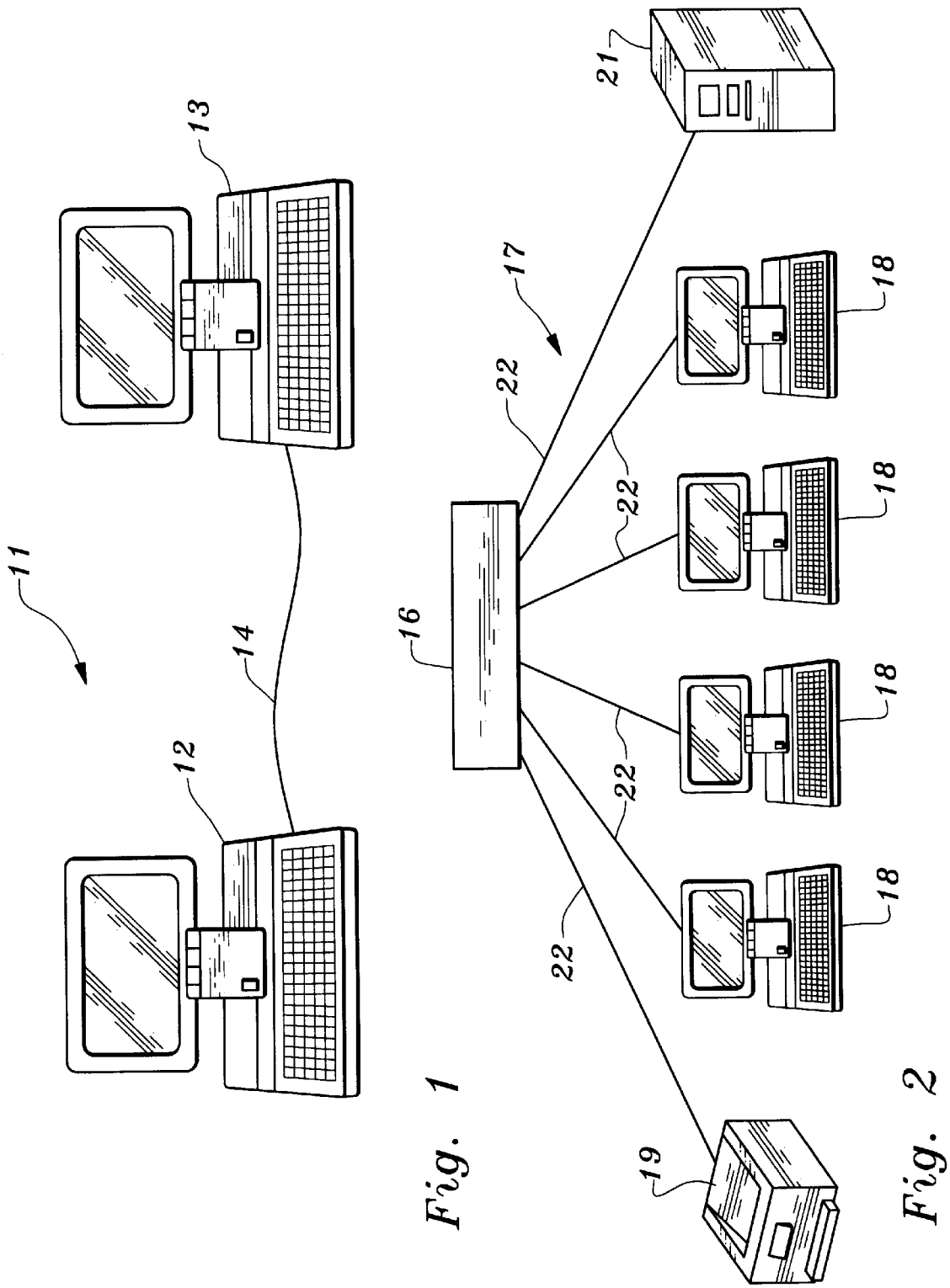

DUAL CHANNEL 100BASE-T LINK FOR COMPUTER NETWORKS

BACKGROUND OF THE INVENTION

1. Field of the Invention

The invention relates generally to media for interconnecting computer network devices, such as computers, hubs, and servers. More particularly, the apparatus herein utilizes two otherwise unused pairs of wires in an existing network interconnection cable, to provide a second communication channel, or link. Use of the second channel doubles the effective bandwidth of the communication link between the network components, thereby eliminating "bottlenecks" and delays in data transfer.

2. Description of Prior Art

Networks are typically used where many personal computers, printers, plotters, FAX machines, scanners, and file servers must function conjunctively in a work environment. The network allows the devices or components of the system to be interconnected, so that data can be accessed and transferred throughout the system. The network also permits users to share network devices, such as printers, FAX machines, and the like.

A computer network which encompasses a relatively small area is known as a local-area network, or LAN. Most LANS are restricted to a single building, or a group of adjacent buildings. However, any number of LANS can be interconnected to each other over any distance by using telephone lines or radio frequency transmissions. A group of LANS connected in the manner is called a wide-area network, or WAN.

Different types of LANS have been developed over the years, differing principally in topology, protocols, and media.

Topology refers to the geometric arrangement of devices in the network. For example, network components may be arranged in a bus or straight line, in a star pattern, or in a ring-like configuration.

Protocols pertain to the rules and encoding specifications for sending and receiving data throughout the network. Protocols also determine whether the network employs a peer-to-peer architecture, where equal responsibilities are assumed by each node, or a client/server architecture, where clients rely upon servers for network resources.

The media of a network is the method by which the devices are interconnected. Commonly used media include twisted-pair wire, coaxial cables, fiber optic cables, or radio frequency transmissions.

The Ethernet protocol, originally developed in 1976, remains one of the most common protocols still used today. An Ethernet network uses either a bus or star topology, and supports data transfer rates ranging from 10 to 1000 Mbps (Megabits/second). The Ethernet specification served as the basis for the IEEE (Institute of Electrical and Electronic Engineers) 802.3 standard. This standard specifies the physical and lower software layers required for data transfer in an Ethernet network. The Ethernet also uses the CSMA/CD (Carrier Sense Multiple Access/Collision Detection) access method, to handle overlapping and simultaneous device access to the network.

The 10Base T (10 Mbps) and 100Base-T (100 Mbps) sections of the IEEE 802.3 CSMA/CD standard describe the mechanical and electrical characteristics of interconnections for the network devices. These characteristics include a point-to-point connection between devices, using a cable having a predetermined maximum length. The cable consists of four wire pairs ("twisted pairs"), contained in a common sheathing. A standardized electrical connector (RJ-45) and a wiring assignment for that connector are also specified. For 10Base T and 100Base-T, the IEEE 802.3 standard specifies the use of only two of the four twisted pairs of wires. While the interconnection of the unused twisted pairs to the standardized connector is specified, their use is not.

SUMMARY OF THE INVENTION

The apparatus of the present invention employs the two unused twisted pairs in an existing Ethernet specified cable to provide a second channel, or link, for data communication in a 100Base-T circuit. This adaptation avoids the need to run additional cabling between devices to provide a second channel. By utilizing the apparatus of the present invention, the effective bandwidth of the communications link is doubled, with relatively few changes to the existing 100Base-T system.

A conventional Media Access Controller (MAC) is modified to include a second communication channel. The modified MAC transfers data packets into an internal transmit FIFO (First In, First Out) storage, having primary and secondary data streams. As words enter the FIFO, the MAC transfers words simultaneously from the two streams to respective primary and secondary MII (Media Independent Interface) circuits. The MII circuits are interconnected, in turn, to primary and secondary PHY (Physical Layer). In this manner, nibbles of data in the primary stream of the FIFO are transferred to the primary PHY, and nibbles in the secondary stream of the FIFO are transferred to the secondary PHY.

The first two pairs of wires in the Ethernet specified cable are connected to the Rx/Tx (Receive/Transmit) connections on the primary PHY. The second two pairs of wires in the cable are connected to the Rx/Tx connection on the secondary PHY.

These components and their respective interconnections are mirrored at the other network device to which the cable is connected.

The receiving MAC at the other network device is responsible for re-assembling the data packets received from the primary and secondary PHY links. FIFO channel skew compensation is provided within the receiving MAC, in the event the lengths in the total wire runs for the two channels are different. In addition, the receiving MAC waits for a predetermined amount of time after receipt of the last nibble to ensure that all data from both the primary and secondary nibbles have been fully received.

In this manner, the two channels act as one higher bandwidth channel. An error detection system in the MAC monitors both channels. If an error is detected, error packet processing is performed in the same manner as with a single channel design. The dual-channel link of the present invention is preferably run in a full-duplex mode, sending and receiving simultaneously. However, the dual channel operation can be applied to a half-duplex channel as well. It is also contemplated, although not required, that auto-negotiation, as defined in the IEEE 802.3u standard, would be performed on both the primary and secondary channels in the course of data transfer.

BRIEF DESCRIPTION OF THE DRAWINGS

FIG. 1 represents a basic point-to-point communication link between two personal computers;

FIG. 2 shows a simple network system, employing a plurality of personal computers, a print server, a file server, and a hub;

DETAILED DESCRIPTION OF THE PREFERRED EMBODIMENT

Figure 3:
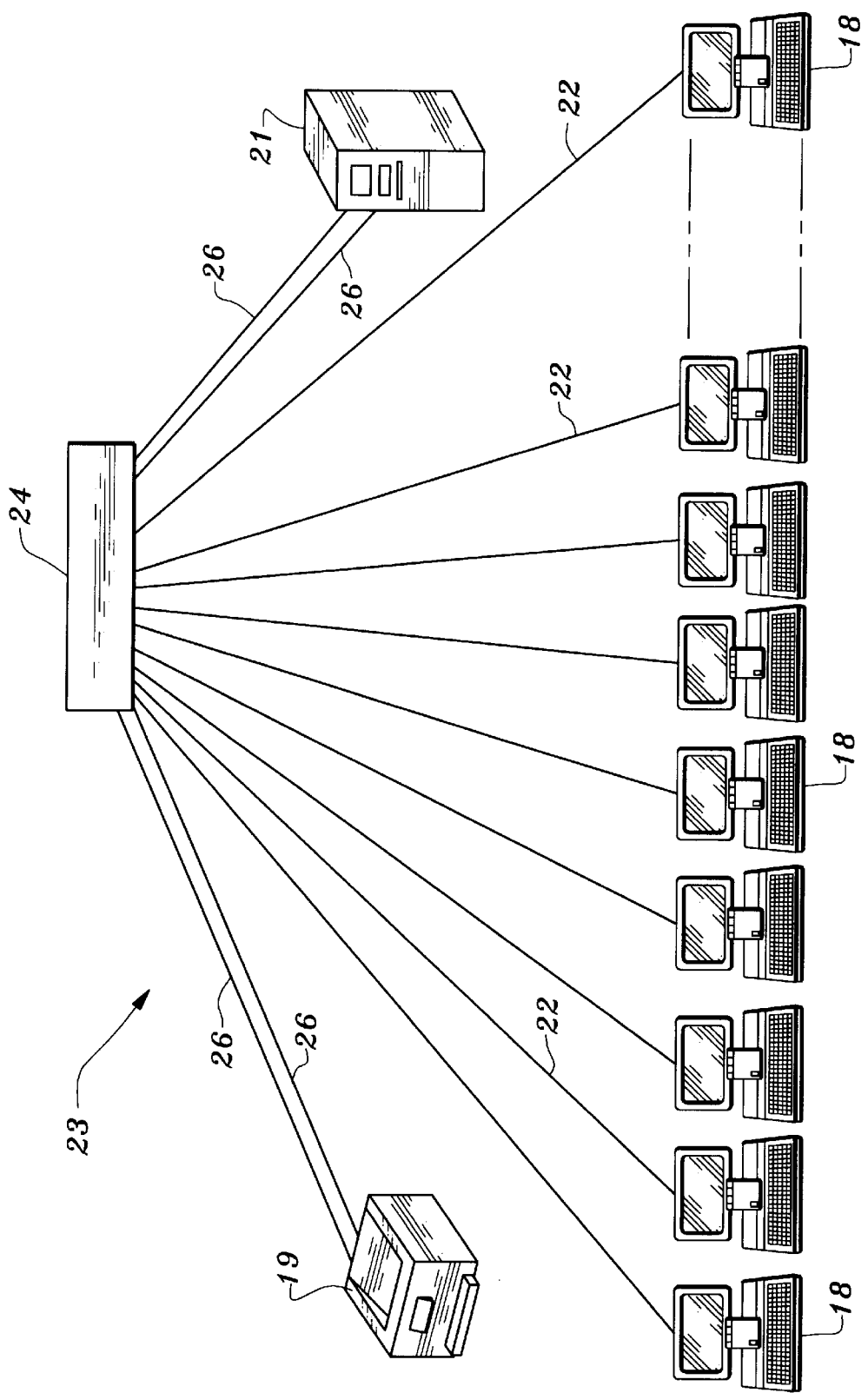
FIG. 3 is illustrates a larger network system, having plural computers, a print server, a file server, and a switch, and including two high speed links trunked between the switch and the file server.

The most basic configuration for networking two computers using the Ethernet protocol is illustrated in FIG. 1. This arrangement is commonly termed a point-to-point base link 11, and includes a computer 12, a computer 13, and a cable 14. Computers 12 and 13 are "free-standing" computers, including all necessary processing and data storage capabilities. In accordance with Ethernet standards, cable 14 consists of four pairs of wires, commonly termed twisted pairs, contained in a common sheathing.

Because Ethernet 10/100Base-T standards specify such a point-to-point link between network devices, a concentrating device 16, or hub, is required if three or more network devices are to be interconnected. FIG. 2 illustrates a typical small scale network 17, employing four computers 18, a print server 19, a file server 21. These devices are all interconnected to hub 16 by means of a plurality of links 22. The links 22 all have the same bandwidth, so that data is transferred through them at the same rate.

In the FIG. 2 arrangement, termed client/server architecture, computers 18 rely upon file servers 21 for storage, retrieval, and sharing of data. The other network resource, print server 19, is also shared by computers 18. Hub 16 facilitates the point-to-point interconnections among the network devices, required by the Ethernet standard.

Network data traffic can generally be categorized as either client to client, or client to server. In client to client traffic, data is sent and received directly between two devices, such as computers 12 and 13. (see FIG. 1). In the far more prevalent, client to server traffic depicted in FIG. 2, data is sent over as a plurality of 10Base T links 22 to and from hub 16. Therein lies the problem. When many clients attempt to access the same server simultaneously, the hub/server link becomes overloaded with data transfer assignments destined either for the print server 19 or the file server 21. This creates a data transfer "bottleneck", reducing the effective bandwidth of the network.

To overcome this problem, a higher speed link may be used between the concentrating device and the server. For example, when a 10Base T concentrating device, such as a switch or a hub is employed, a 100Base T link (10 mbps) is used to interconnect the personal computers to the concentrating device, and a 100Base-T link (100 mbps) is used between the concentrating device and servers.

Using a higher bandwidth link to interconnect the concentrating device and a server is an effective solution, providing it is economically feasible to install the higher performance link, and the link satisfies the required bandwidth. However, as the number of computers in a network increases, a single higher bandwidth link may be insufficient to transfer the data quickly. For example, where a network includes twenty-four computers connected to a concentrator, the computers represent a potential peak bandwidth of 24×10 mbps=240 mbps. This is more than double the bandwidth of the previously mentioned 100Base-T concentrator to server link.

FIG. 3 shows such a medium size network 23, including twenty-four computers 18, a print server 19, and a file server 21. A hub 24 has twenty-four 10Base T links 22 to each of the computers 18. However, to provide additional bandwidth, a pair of 100Base-T links extends from the hub to print server 19 and to file server 21. This use of multiple high speed links is also referred to as trunking.

Heretofore, trunking has required that two or more cables be run between the network devices to be trunked. If the devices are adjacent each other in the same cabinet, retrofitting the devices with a new, separate cable does not normally pose a large problem. However, when the devices are in remote locations, up to several hundred feet apart, trunking may be difficult or impossible. If the devices are on different floors of a building, or in different buildings, running a separate cable to gain the additional bandwidth may be physically or economically impractical.

There are some further disadvantages with trunking. Trunking requires additional data processing in both of the trunked devices, as traffic must be partitioned between the two links. This additional processing may inhibit performance at the required speed, and inevitably results in higher costs for trunked devices. And, to implement trunking, user intervention is required to make the physical interconnections between the devices and to configure them for trunking operation.

The present invention uses the two unused pairs of wires in an existing Ethernet specified cable to carry an additional 10/100Base-T standard link. This arrangement avoids the need to run additional cabling between devices for trunking. The features and implementation of the invention can best be understood by first making reference to one end of a prior art 100Base-T communication link, generally identified by the numeral 27 in FIG. 4.

Cable 28 is known as a Category 5 twisted pair cable, carrying four twisted pairs of wire in a common sheath. This cable is the physical media which electrically connects the network devices together. First pair 29 (wires 1 and 2) and second pair 31 (wires 3 and 6) are connected to an RJ-45 jack 34, in accordance with the Ethernet specified wiring scheme. Third pair 32 (wires 7 and 8) and fourth pair 33 (wires 4 and 5) are unconnected and unused in the existing, single channel, 100Base-T implementation.

A Physical Layer ("PHY") 36 is interconnected to jack 34 by lines 37 and 38. The PHY 36 performs the transmit, receive, control, and encoding functions for data which are carried over and extracted from the physical media, cable 28. Within PHY 36, are Physical Coding Sublayer ("PCS") 39, Physical Media Attachment ("PMA") 41, and Physical Medium Dependent ("PMD") 42. The functions and operations of these sub-components of PHY 36 are well known to those of ordinary skill in the art, and need not be described further to understand the description of the invention herein.

Link end 27 also includes a Media Independent Interface ("MII") 43, linking PHY 36 with a Media Access Controller ("MAC") 44. The MAC is responsible for sending and receiving data to and from the PHY 36. In this process, the MAC accesses a system memory controller (not shown) which in turn transfers data to and from a system memory (not shown). Various circuits to and from the MAC handle this transfer of data in accordance with Ethernet protocol.

For example, the RxClk (receive clock) line 46, controls the rate at which data received on RxD (receive data) line 47 is decoded. On transmit, TxClk (transmit clock) line 48 controls the rate at which data transmitted on TxD (transmit data) line 49 is encoded. Control line 51 facilitates the two way cooperation of MAC 44 and PHY 36.

It should also be noted that at the other end of cable 28, an arrangement exists which mirrors that of link end 27. Implementing the data encoding and transfer protocols of the Ethernet, such a system transmits and receives data through cable 28.

Figure 4:
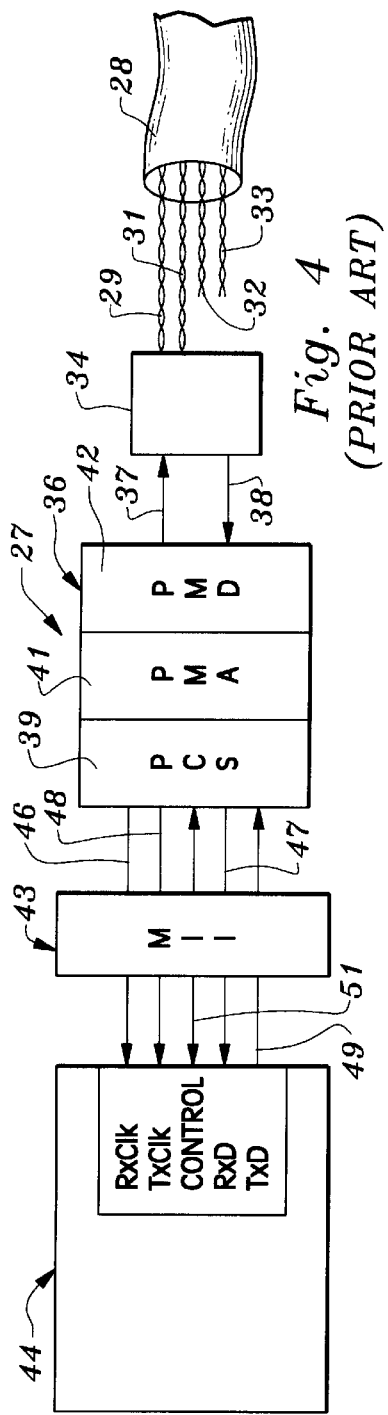
FIG. 4 is a block diagram of a typical 100Base-T circuit.
Figure 5:
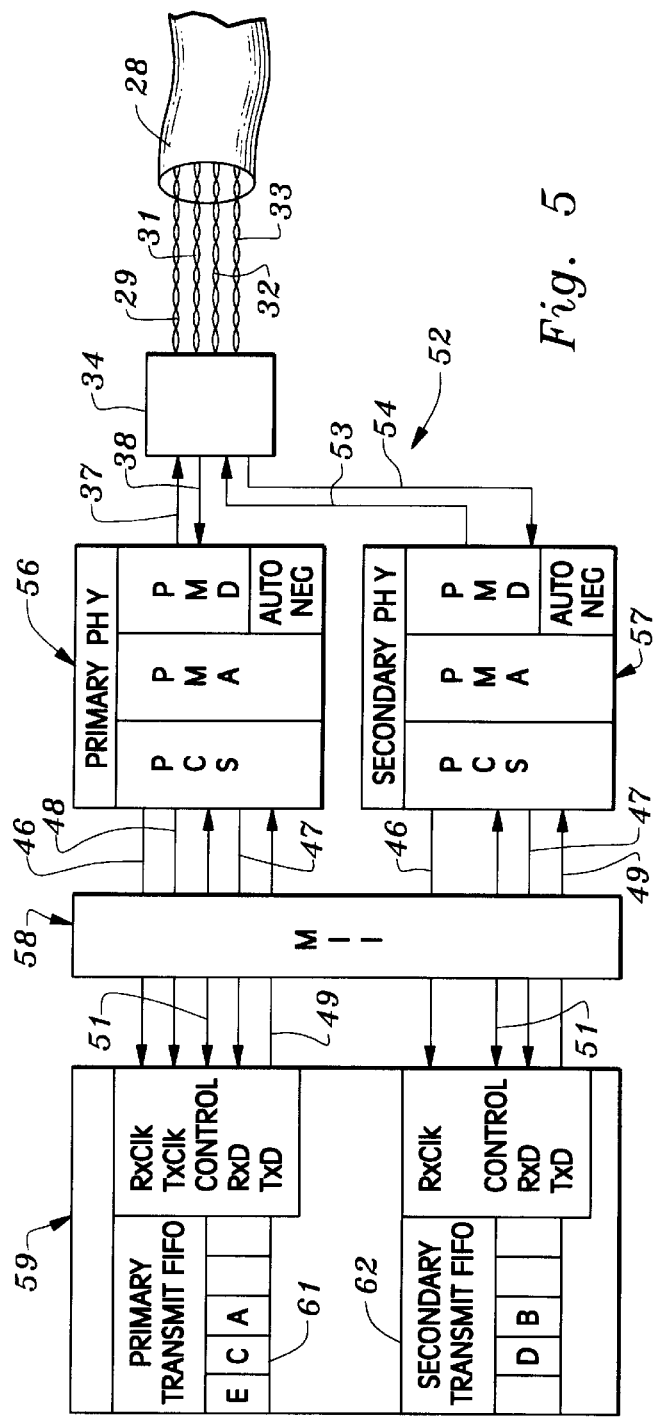
FIG. 5 is a block diagram of the cooperative, dual channel, 100Base-T circuit of the present invention.

With this as background, the physical and operational features of link end 52 in FIG. 5, will now be discussed. Link end 52 will be used to teach an implementation of the dual channel cooperative 100Base-T link of the present invention. For the sake of simplicity, the same numerical designations used in FIG. 4 will be used in describing identical elements of the present invention. Thus, for example, RxClk line 46 in FIG. 4 is identically designated as RxClk 46 in FIG. 5. Initially, it should be noted that third pair 32 and fourth pair 33 of cable 28 are connected to jack 34. Alternatively, pairs 32 and 33 could be interconnected to a separate RJ-45 jack, and a separate connection port could be provided on the associated network device. In either manner of interconnection, it is these previously unused pairs of wires which provide the media for the second communication channel.

For 100Base-T and 10Base T devices, there are two ways in which the standard RJ-45 connector can be wired. End node devices, such as personal computers, printers, FAX machines, scanners, and file servers are wired in accordance with the MDI (Media Dependent Interface) specification of the IEEE 802.3 standard. Concentrating devices, such as routers, switches, and hubs are wired internally to cross the receive and transmit pairs at the connector.

To interconnect an end node device to a concentrating device requires a twisted pair cable with equivalent pin assignments at each end. To interconnect two concentrating devices requires the use of a "crossover", or MDI-X cable. A crossover cable is typically formed by swapping the receive and transmit twisted pairs at one end of the cable.

The IEEE 802.3 standard specifies the cable to connector pin assignment for 10Base T and 100Base-T cabling. For both the straight through and the crossover cable assignments, the unused pairs are connected to pins 4 & 5 and pins 7 & 8. As a result, it will be necessary electrically to "crossover" the pairs at one end of the cooperative link, or it will be necessary to attach a new connector end to the cable to effect a swap of both the 1 & 3 and the 3 & 6 pairs, and the 4 & 5 and the 7 & 8 pairs, in order for both channels to be properly interconnected. Preferably, the swapping of the pairs is performed electrically and automatically, so that the cabling and dual channel functions herein are transparent to the user and automatic in operation.

Connected to the other side of jack 34 are lines 37 and 38, for a primary channel, and lines 53 and 54 for a secondary channel. Lines 37 and 38, in turn, connect to a primary PHY 56, and lines 53 and 54 connect to a secondary PHY 57. Primary PHY 56 and secondary PHY 57 are identical to PHY 36 described previously, except that an automatic negotiation feature is included in the PHY for each channel. Specifics of the automatic negotiation feature will be discussed below.

A dual-channel MII (Media Independent Interface) 58 is interposed between Primary PHY 56/Secondary PHY 57, and a dual-channel MAC 59. The dual-channel implementation also requires two receiver clock lines 46, two control lines 5 1, two receive data lines 47, and two transmit data lines 49. However, only one common transmit clock line 48 is necessary to coordinate transmission of data from the MAC 59 to PHY 56 and PHY 57.

The network device which includes link end 52 has system memory. Transmission of data begins when a packet is buffered into this system memory. This packet must be properly arranged and maintained in memory, so that when transmitting, the MAC 59 will be able consistently to distinguish the nibble (4 bits of data) ordering of the packet. For example, the MAC 59 must be able to distinguish the most significant nibble from the least significant, so that the packet will correctly be reassembled at the other end of the network link.

To ensure that operation of the dual-channel link is transparent and automatic to the interconnected network device, MAC 59 divides data packets between the two channels. To carry out this data division, a primary transmit FIFO (First In, First Out) memory 61 and a secondary transmit FIFO memory 62 are provided. It is the responsibility of the MAC 59 to transfer the data packets from the system memory into the two FIFO memories, maintaining proper nibble order at all times.

In the preferred embodiment, the FIFOS 61 and 62 are arranged into 8-bit (two nibble) words by the depth of the FIFOS. As words are placed into the FIFOS, the MAC begins to transfer words to the respective PHYS simultaneously. Thus, nibbles in the primary FIFO 61 are transferred to primary PHY 56, and nibbles in the secondary FIFO 62 are transferred to secondary PHY 57. The sequenced transfer of nibbles occurs in accordance with the clock rate determined by the common transmit clock in PHY 56. In FIG. 5, the two nibble words, represented by the letters as A/B, and C/D sequentially enter and exit the primary and secondary FIFOS in timed relation.

The receiving MAC (not shown), is located at the interconnected network device. The receiving MAC is responsible for the re-assembly of packets received from the PHY links, 56 and 57. Unfortunately, the paths of the two channels are not necessarily equal in length, and compensation for path length differences may be necessary. For example, depending upon the number of twists in the wires, and the tension placed on each wire pair during its manufacturing process, the pair lengths can be different. Also, if a patch panel is used to route the cable, patch cords can also introduce differences in overall path lengths. Consequently, the receiving MAC must assume that a difference in path length exists, and therefore that the two channels will have different receive timing, and therefore different extracted receive clocks.

Assume, in a worst case scenario, that the twisted pairs vary 8% in length from pair to pair within the same cable. Therefore, a 100 m cable could have a worst case length difference of 8 m, or 26 feet, for Category 5 100Base-T cabling. Because signals travel along this cable at approximately 65% the speed of light, the time for signals to travel the difference in length is:

$$(8 \text{ m})(1/(0.65 \times c)) = 8 \text{ m}(1/(0.65 \times 29900000 \text{ m/s})) = 40 \text{ ns}$$

Figure 6A:
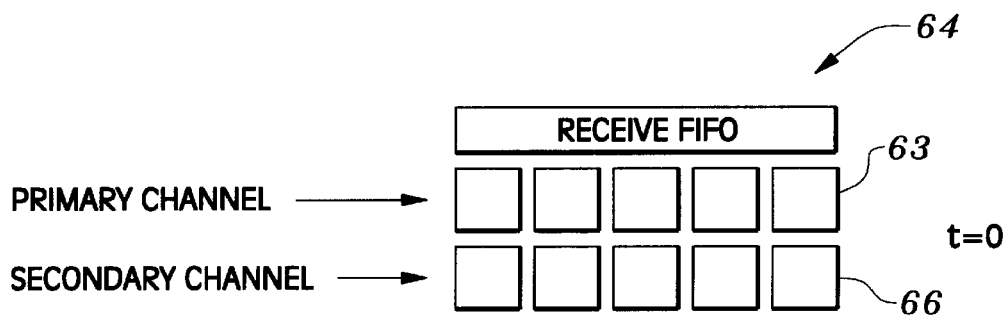
FIGS. 6(a)–6(d) show the receiving FIFO skew compensation process, for nibbles arriving on the two channels at different times.
Figure 6B:
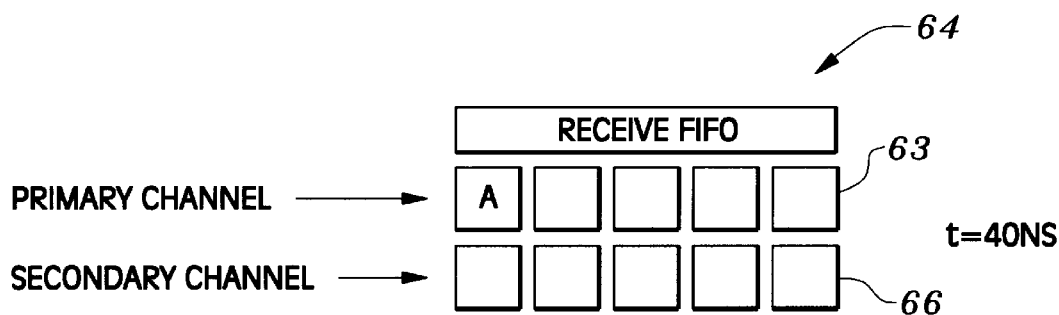

For 100Base-T data transfer rate, 40 ns corresponds to 40 ns/8 ns=5 bits of data on the wire. Here, the 8 ns term corresponds to the time between each consecutive bit on the wire. Under the assumed length difference, this means that one channel may receive bits on the wire before the other channel receives its first bit. This temporal offset in the receipt of bits is depicted in FIGS. 6(a) and 6(b), for the circumstance where the path length of the secondary channel is longer than the path length of the primary channel. The reversecircumstance, of course, could also exist. In FIG. 6(a), at t=0, no data has yet been received. In FIG. 6(b), at t=40 ns, nibble A has arrived in the primary channel 63 of a receive FIFO 64, but nibble B is still on the wire.

Figure 6C:
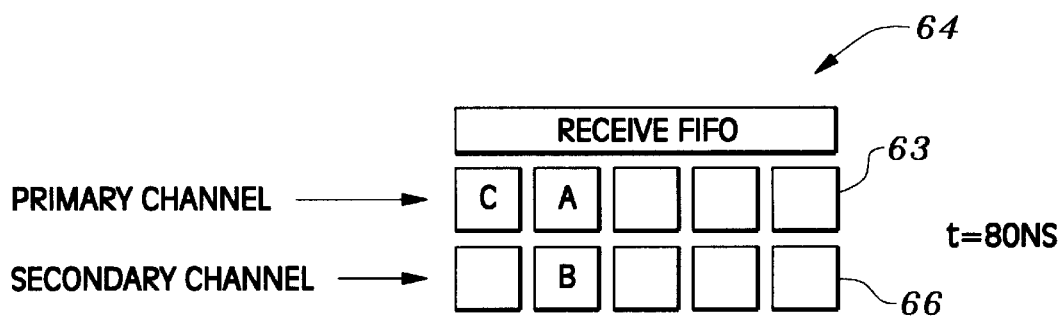
Figure 6D:
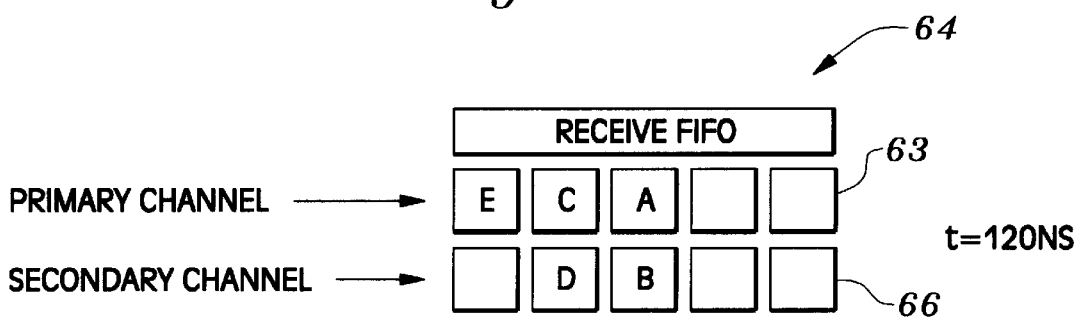

It is the responsibility of the receiving MAC to compensate for this variation, as nibbles of data arrive at the interconnected network device. FIFO skew compensation, accomplished by the receiving MAC, is shown in FIG. 6(c) at t=80 ns. The B nibble has been entered into the secondary channel 66 of the receive FIFO 64 in the same timed relation with respect to nibble A, as existed in the transmit FIFO, in FIG. 5. Also, FIG. 6(c) shows that nibble C has now been entered into the primary channel 63 of the receive FIFO 64 without nibble D. Again, as shown in FIG. 6(d) at t=120 ns, the receive MAC compensates for the time delay, and enters nibble D into the secondary channel 66 of the receive FIFO in proper timed relation with respect to nibble C. Also evident in FIG. 6(d) is nibble E of the next word, entering primary channel 63.

If the MAC is to transfer received packet data to an external 16 bit wide memory, it would need to wait for 16 bits of data (two nibbles, over two channels), plus one additional nibble (4 bits at the MAC, 5 bits on the wire), on either the primary or secondary channels, to ensure that the data from both the primary and secondary nibbles in the packet have been fully received.

Owing to the fact that the two channels cooperatively act as one higher bandwidth channel, any error condition on either channel affects the packet data. Therefore, any error conditions on either channel should be treated as an error in overall transmission of data for the link. For example, if an error occurred either on the primary or the secondary channel, then error packet processing should be performed in the same manner as it would with single channel link implementation.

Also consistent with the objective of providing a high bandwidth link in a network system, the dual-channel link herein should operate in full-duplex mode, sending and receiving at the same time. However, the dual-channel feature of the present invention can be applied to a half-duplex channel as well.

Further, it is contemplated, but not required, that auto-negotiation, as defined in the IEEE 802.3 standard will be performed on both the primary and secondary channels to establish operation. If a device with a cooperative dual-channel MAC as described above, is connected to a conventional network link with a single channel MAC at the other end, the secondary channel will not be detected. In this instance, secondary channel will not be used, and the MACS at both ends of the link will communicate together on the primary channel. Hence, the cooperative, dual-channel function is backwards compatible with existing single channel links.

It will be appreciated, then, that we have disclosed a dual-channel 100Base-T link for use between devices in a computer network system. The dual-channel system increases the effective bandwidth of the link without the necessity of running an additional cable. Relatively few changes in the mechanical and electrical features of the network interconnections are required. The dual-channel link is straightforward to install, and may be made operational with little user intervention.

What is claimed is:

1. A dual channel 100Base-T link for use in a first computer network device, comprising:

a. a media access controller;
b. a primary and a secondary physical layer;
c. a primary and a secondary media independent interface, said primary media independent interface connecting said media access controller with said primary physical layer, and said secondary media independent interface connecting said media access controller with said secondary physical layer; and,
d. a single cable having four twisted pairs of wires within a common sheathing, a first two of said twisted pairs at one end of said cable being interconnected to said primary physical layer, establishing a primary communication channel, and a second two of said twisted pairs at said one end of said cable being interconnected to said secondary physical layers, thereby establishing a secondary communication channel within said single cable.

2. An apparatus as in claim 1 in which said network device includes a system memory and a system memory controller for inputting and outputting data from the system memory, and in which said media access controller transfers data outputted from the system memory into a primary transmit FIFO memory and a secondary transmit FIFO memory.

3. An apparatus as in claim 2 in which said media access controller transfers data both from said primary transmit FIFO memory into said primary media independent interface and from said secondary transmit FIFO memory into said secondary media independent interface.

4. An apparatus as in claim 2 in which the data is transferred into said primary and secondary FIFO memories as 8-bit words.

5. An apparatus as in claim 1 including a second network device, and in which the other end of said cable is interconnected to said second network device.

6. An apparatus as in claim 5 in which said second network device includes skew compensation means to correct for differences in length between said first two twisted pairs and said second two twisted pairs.

7. An apparatus as in claim 6 in which said skew compensation means includes a primary receive FIFO memory and a secondary receive FIFO memory.

8. An apparatus as in claim 1 in which said first two twisted pairs include receive and transmit pairs of wires and said second two twisted pairs include receive and transmit pairs of wires.

9. An apparatus as in claim 1 in which said primary media independent interface includes a data receive line, a data transmit line, a control line, a receive clock line, and a transmit clock line.

10. An apparatus as in claim 9 in which said secondary media independent interface include a data receive line, a data transmit line, a control line, and a receive clock line.

11. A dual channel 100Base-T link for use between two devices in a computer network system, comprising:

a. a media access controller at each device;
b. a primary and a secondary physical layer at each device;
c. a primary and a secondary media independent interface at each device, each said primary media independent interface connecting a respective one of said media access controllers with a respective one of said primary physical layers, and each said secondary media independent interface connecting a respective one of said media access controllers with a respective one of said secondary physical layers; and,
d. a single cable having four twisted pairs of wires within a common sheathing, a first two of said twisted pairs being interconnected between said primary physical layers at each device, establishing a primary communication channel, and a second two of said twisted pairs being interconnected to said secondary physical layers at each device, thereby establishing a secondary communication channel within said single cable.

12. An apparatus as in claim 11 including skew compensation means to correct for differences in length between said first two twisted pairs and said second two twisted pairs.

13. An apparatus as in claim 12 in which said skew compensation means includes a primary receive FIFO memory and a secondary receive FIFO memory.

14. An apparatus as in claim 11 in which at least one of said network devices includes a system memory and a system memory controller for inputting and outputting data from the system memory, and in which a respective said media access controller in said one of said network devices transfers data outputted from the system memory into a primary transmit FIFO memory and a secondary transmit FIFO memory.

15. An apparatus as in claim 14 in which said media access controller in said one of said network devices transfers data both from said primary transmit FIFO memory into said primary media independent interface and from said secondary transmit FIFO memory into said secondary media independent interface.

16. An apparatus as in claim 14 in which the data is transferred into said primary and secondary FIFO memories as 8-bit words.

17. An apparatus as in claim 11 in which said first two twisted pairs include receive and transmit pairs of wires and said second two twisted pairs include receive and transmit pairs of wires.

18. An apparatus as in claim 11 in which said primary media independent interface includes a data receive line, a data transmit line, a control line, a receive clock line, and a transmit clock line.

19. An apparatus as in claim 18 in which said secondary media independent interface include a data receive line, a data transmit line, a control line, and a receive clock line.

* * * * *